Oct. 18, 1966  R. T. FARRELL  3,279,562
EQUALIZER FOR A VEHICLE LIFT
Filed July 17, 1964
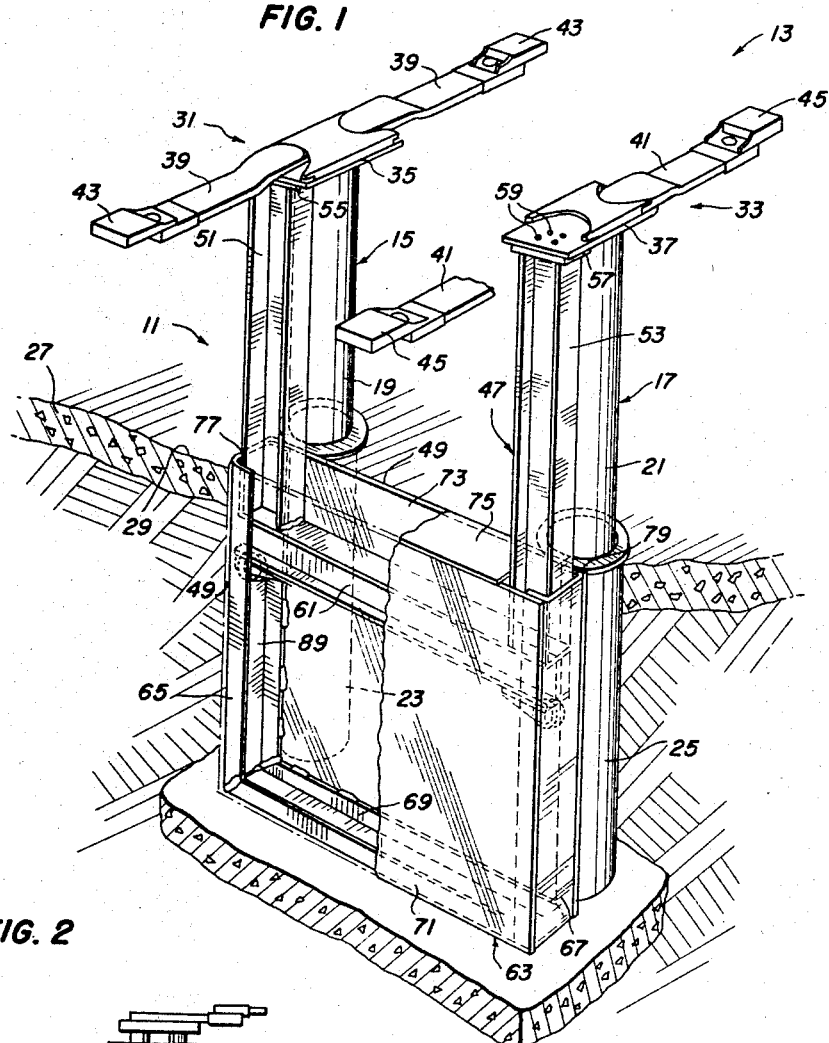
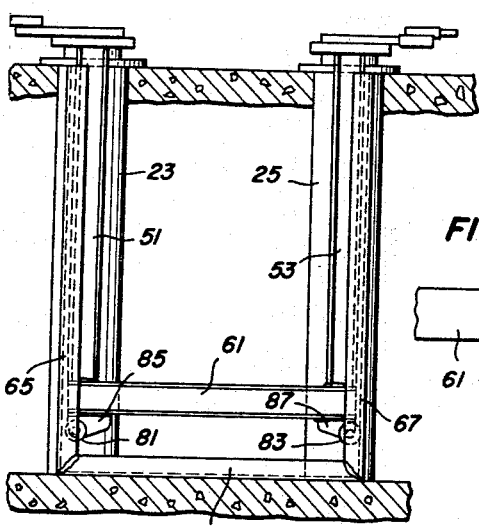
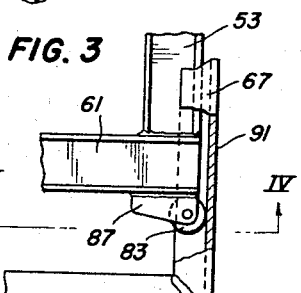
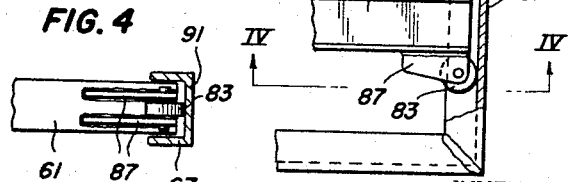
INVENTOR.
RICHARD T. FARRELL
BY John R. Walker, III
Attorney

United States Patent Office 3,279,562
Patented Oct. 18, 1966

3,279,562
EQUALIZER FOR A VEHICLE LIFT
Richard T. Farrell, Memphis, Tenn., assignor to
Dover Corporation, Washington, D.C.
Filed July 17, 1964, Ser. No. 383,451
5 Claims. (Cl. 187—8.41)

This invention relates to equalizers for vehicle lifts, and particularly relates to equalizers for multiple-post vehicle lifts, as, for example, for the so-called two-post type, which comprises a pair of vertical jacks with each including a piston telescopically received in a cylinder which is embedded in a foundation, as the ground or other supporting structure, and with each piston having a vehicle or load supporting structure mounted on the upper end thereof separate from the corresponding load supporting structure on the other piston.

Previously, in the above-mentioned type of vehicle lifts, there have been various different types of equalizers used for maintaining the supporting structures in alignment with one another, as, for example, cable equalizers, and rack and pinion equalizers. However, these previous equalizers had a number of disadvantages. Thus, in the cable type, there were, among others, the problems of cable breakage, rust and deterioration, and the necessity of having to adjust the cables for alignment of the members. In the rack and pinion type, there were the problems of foreign objects getting between the rack and pinion, and other maintenance problems such as lubrication.

The present invention is directed towards overcoming the above-mentioned and other problems inherent in previous types of equalizers for multiple-post vehicle lifts by providing an equalizer that rigidly and positively ties together the vehicle supporting structures of multiple-post lifts.

Thus, one of the objects of the present invention is to provide a rigid equalizer for multiple-post vehicle lifts.

A further object is to provide an equalizer in which maintenance problems are substantially eliminated.

A further object is to provide such an equalizer in which the lubrication problems are eliminated.

A further object is to provide an equalizer that is much simpler, more economical, and easier to install than previous equalizers.

A further object is to provide such an equalizer that comprises a substantially U-shaped rigid connector which moves vertically in a pit and includes a pair of vertical members respectively fixedly attached to the vehicle supporting structures adjacent said jacks and depending from said supporting structures, and an elongated transverse member connected adjacent the opposite ends thereof respectively to said vertical members adjacent the lower ends thereof, with said transverse member remaining at all times below the ground or floor level, whereby it does not obstruct the space between the jacks and does not interfere with the auto mechanic's work.

A further object is generally to improve the design and construction of equalizers for vehicle lifts.

The means by which the foregoing and other objects of the present invention are accomplished and the manner of their accomplishment will be readily understood from the following specification upon reference to the accompanying drawings, in which:

FIG. 1 is a perspective view of the device of the present invention shown in conjunction with a vehicle lift, with parts being broken away for purposes of illustration, and with the lift being shown in a raised position.

FIG. 2 is an elevational view of the same, with parts being removed for purposes of illustration, and showing the lift in a lowered position.

FIG. 3 is an enlarged fragmentary view of a portion of the device shown in FIG. 2, and with parts broken away for purposes of illustration.

FIG. 4 is a fragmentary sectional view taken as on the line IV—IV of FIG. 3.

Referring now to the drawings in which the various parts are indicated by numerals, the equalizer 11 of the present invention is shown in the drawing in connection with a two-post fluid-operated lift, which is indicated in general by the numeral 13, and which comprises the usual pair of vertical jacks 15, 17 that respectively include pistons 19, 21 that are slidably and telescopically respectively received in the usual cylinders 23, 25. Cylinders 23, 25 are stationarily embedded in the usual manner in spaced relationship to each other in a foundation 27, as the ground or other supporting medium, with the upper ends of the cylinders being adjacent the upper surface 29 of foundation 27. In addition, lift 13 comprises separate vehicle or load supporting structures 31, 33 that are respectively fixedly attached to the upper end of pistons 19, 21. Load supporting structures 31, 33 are of any suitable construction and preferably respectively include head plates 35, 37, which are the parts actually attached to the pistons 19, 21. In addition, load supporting structures 31, 33 preferably include pivoted arms 39, 41 having pads 43, 45 mounted thereon. The fluid system for raising and lowering pistons 19, 21 is not shown since it forms no part of the present invention and comprises any suitable well-known means which utilizes a suitable fluid such as the combination of hydraulic and air pressure, or hydraulic fluid alone. It will be understood that, in the heretofore described two-post lift 13, it is necessary that the lift be equalized so that the pistons 19, 21, and therefore the load supporting structures 31, 33, will always be maintained at the same height. In other words, it is necessary for the load supporting structures 31, 33 to be horizontally aligned during all positions of the lift; otherwise it would create a hazard with the danger of the vehicle falling off the lift.

In general, it is the concept of the present invention to rigidly and positively tie the load supporting structures 31, 33, and thereby the pistons 19, 21, together by means of equalizer 11, which is constructed in accordance with the present invention so that there are no exposed members extending between the jacks 15, 17. In general, the present invention accomplishes this concept by providing equalizer 11 which includes a substantially U-shaped rigid connector 47 that is fixedly attached to the respective load supporting structures 31, 33 and extends downwardly into a pit 49 provided in foundation 27 below connector 47.

Referring now in more detail to equalizer 11 and referring first to the preferable construction of connector 47, the connector comprises a pair of vertical members 51, 53, which are of any suitable rigid construction, as, for example, I-beam construction, and which are respectively fixedly attached adjacent the upper ends thereof to load supporting structures 31, 33. The actual attachments are preferably to the bottom side of head plates 35, 37 as by means of plates 55, 57 welded to the top of the vertical members and attached to the head plates by means of the bolt fasteners 59. Vertical members 51, 53 respectively depend downwardly from load supporting structures 31, 33 in closely spaced relationship to jacks 15, 17 and down into pit 49. Connector 47 additionally includes an elongated transversely extending member 61 fixedly connected adjacent the opposite ends thereof respectively to the lower ends of vertical members 51, 53, as by welding or the like. Transverse member 61 is of any suitable rigid construction, as, for example, I-beam construction, and rigidly interconnects the vertical members 51, 53. Vertical members 51, 53 are of such length that the transverse member 61 always remains in pit 49 and below upper surface 29, even when the lift 13 is in its uppermost position, as shown in FIG. 1. Thus, it will be seen that no additional parts of the underside of a vehicle are obstructed by equalizer 11 than would ordinarily be obstructed by a two-post lift, since vertical members 51, 53 are below head plates 35, 37 in closely spaced relationship to jacks 15, 17, and transverse member 61 is below upper surface 29.

A casing 63 is received in pit 49 around connector 47 and in which the connector moves. Casing 63 is secured in place and preferably fixedly attached to cylinders 23, 25 by suitable means, not shown. Casing 63 preferably comprises a substantially U-shaped framework formed of channel members that include vertical side members 65, 67 rigidly interconnected adjacent the lower ends thereof by lower member 69. Members 65, 67 are preferably so arranged that their flanges extend inwardly towards one another, and the flanges of member 69 extend upwardly. In addition, casing 63 preferably includes spaced front and back plates 71, 73 respectively fixedly attached to the front and back sides of members 65, 67, and 69 as by welding or the like. Casing 63 terminates at the upper end thereof adjacent upper surface 29 and is preferably provided with a cover plate 75 extending in the space between vertical members 51, 53 to leave openings 77, 79 in the upper end of the casing through which the vertical members 51, 53 move.

A pair of rollers 81, 83 are mounted on connector 47 at the lower corners thereof, respectively as by means of brackets 85, 87 attached to transverse member 61 in such a position that the rollers 81, 83 respectively rollingly engage the webs 89, 91 of side members 65, 67. It will be understood that as the jacks 15, 17 are extended and retracted, the connector 47 will be carried upwardly and downwardly therewith, and the rollers 81, 83 will roll along the webs 89, 91 to rollingly guide the movement of the connector relative to the casing 63 and add stability to the device.

From the foregoing description, it can be seen that an economical and yet highly effective rigid equalizing means is provided for multiple-post vehicle lifts, which eliminates many of the problems in previous equalizers.

Although the invention has been described and illustrated with respect to a preferred embodiment thereof, it is to be understood that it is not to be so limited since changes and modification may be made therein which are within the full intended scope of this invention is hereinafter claimed.

I claim:

1. In a vehicle lift of the type mounted in a foundation and having at least a pair of vertically movable portions, including separate horizontally aligned load supporting structures movable between raised and lowered positions relative to said foundation, an equalizing device for said vehicle lift comprising a rigid unitary connector means rigidly and fixedly attached to said pair of vertically movable portions and vertically movable as a whole therewith for rigidly connecting said movable portions to keep said load supporting structures in horizontal alignment for simultaneous corresponding movement, and said foundation being provided with a pit below said connector means movably receiving said vertically movable connector means.

2. In a vehicle lift of the type including a pair of vertical jacks respectively including cylinders respectively receiving vertically movable pistons therein and separate vertically movable load supporting structures respectively attached to said pistons adjacent the upper ends thereof and with said cylinders being embedded in spaced relationship to each other in a foundation with the upper end of said cylinders being adjacent the upper surface of said foundation, an equalizing device for said vehicle lift comprising a rigid connector carried vertically by said supporting structures between raised and lowered positions upon corresponding raising and lowering of said pistons, said rigid connector including a pair of substantially verical rigid members respectively fixedly attached adjacent the upper ends thereof to said load supporting structures closely adjacent said jacks and respectively depending from said load supporting structures, said rigid connector including transverse means fixedly attached respectively to said vertical members for fixedly interconnecting said vertical members and tying together said vertical members and said transverse means as a whole to move vertically as a unit upon raising and lowering of said pistons, said foundation being provided with a pit therein below said connector, said connector rigidly interconnecting said load supporting structures with said load supporting structures being horizontally aligned whereby said load supporting structures are tied together for simultaneous corresponding movement, and said vertical members being the only portions of said connector exposed above said foundation.

3. In a vehicle lift of the type including a pair of vertical jacks respectively including cylinders respectively receiving vertically movable pistons therein and separate vertically movable load supporting structures respectively attached to said pistons adjacent the upper ends thereof and with said cylinders being embedded in spaced relationship to each other in a foundation with the upper end of said cylinders being adjacent the upper surface of said foundation, an equalizing device for said vehicle lift comprising a rigid substantially U-shaped connector including a pair of substantially vertical members respectively fixedly attached adjacent the upper ends thereof to said load supporting structures closely adjacent said jacks and respectively depending from said load supporting structures, and elongated transverse means connected adjacent the opposite ends thereof respectively to said vertical members adjacent the lower ends thereof for rigidly interconnecting said vertical members; said foundation being provided with a pit therein below said U-shaped connector, said connector being carried by said supporting structures between raised and lowered positions upon corresponding raising and lowering of said pistons, said connector rigidly interconnecting said load supporting structures with said load supporting structures being horizontally aligned whereby said load supporting structures are tied together for simultaneous corresponding movement, said transverse means remaining entirely below the upper surface of said foundation at all times and said vertical members being the only portions of said connector exposed above said foundation.

4. In a vehicle lift of the type including a pair of vertical jacks respectively including cylinders respectively receiving vertically movable pistons therein and separate vertically movable load supporting structures respectively attached to said pistons adjacent the upper ends thereof and with said cylinders being embedded in spaced relationship to each other in a foundation with the upper end of said cylinders being adjacent the upper surface of said foundation, an equalizing device for said vehicle lift comprising a rigid substantially U-shaped connector including a pair of substantially vertical members respectively fixedly attached adjacent the upper ends thereof to said load supporting structures closely adjacent said jacks and respectively depending from said load supporting structures, and elongated transverse means connected adjacent the opposite ends thereof respectively to said vertical members adjacent the lower ends thereof for rigidly interconnecting said vertical members; said foundation being provided with a pit therein below said U-shaped connector, a stationary casing fitted in said pit and movably receiving said U-shaped connector, said connector being carried by said supporting structure between raised and lowered positions in said casing upon corresponding raising and lowering of said pistons, said connector rigidly interconnecting said load supporting structures with said load supporting structures being horizontally aligned whereby said load supporting structures are tied together for simultaneous corresponding movement, said transverse means remaining entirely below the upper surface of said foundation at all times and said vertical members being the only portions of said connector exposed above said foundation.

5. In a vehicle lift of the type including a pair of vertical jacks respectively including cylinders respectively receiving vertically movable pistons therein and separate vertically movable load supporting structures respectively attached to said pistons adjacent the upper ends thereof and with said cylinders being embedded in spaced relationship to each other in a foundation with the upper end of said cylinders being adjacent the upper surface of said foundation, an equalizing device for said vehicle lift comprising a rigid substantially U-shaped connector including a pair of substantially vertical members respectively fixedly attached adjacent the upper ends thereof to said load supporting structures closely adjacent said jacks and respectively depending from said load supporting structures, and elongated transverse means connected adjacent the opposite ends thereof respectively to said vertical members adjacent the lower ends thereof for rigidly interconnecting said vertical members; said foundation being provided with a pit therein below said U-shaped connector, a stationary casing fited in said pit and movably receiving said U-shaped connector, said connector being carried by said supporting structures between raised and lowered positions in said casing upon corresponding raising and lowering of said pistons, means substantially covering the top of said casing, said connector rigidly interconnecting said load supporting structures with said load supporting structures being horizontally aligned whereby said supporting structures are tied together for simultaneous corresponding movement, said transverse means remaining entirely below the upper surface of said foundation at all times and said vertical members being the only portions of said connector exposed above said foundation, and guide means interposed between said U-shaped connector and said casing for guiding the movement of said connector relative to said casing.

References Cited by the Examiner
UNITED STATES PATENTS

| | | | |
|---|---|---|---|
| 2,593,630 | 4/1952 | Thompson | 187—8.41 |
| 2,821,264 | 1/1958 | Ulinski | 187—9 |

EVON C. BLUNK, *Primary Examiner.*

H. C. HORNSBY, *Assistant Examiner.*